US012726357B2

(12) United States Patent
Kuo

(10) Patent No.: US 12,726,357 B2
(45) Date of Patent: Sep. 1, 2026

(54) AUTHORIZATION MANAGEMENT METHOD AND SYSTEM

(71) Applicant: Getac Technology Corporation, New Taipei (TW)

(72) Inventor: Po-Yang Kuo, Taipei (TW)

(73) Assignee: Getac Technology Corporation, New Taipei (TW)

( * ) Notice: Subject to any disclaimer, the term of this patent is extended or adjusted under 35 U.S.C. 154(b) by 86 days.

(21) Appl. No.: 18/731,502

(22) Filed: Jun. 3, 2024

(65) Prior Publication Data

US 2025/0132920 A1 Apr. 24, 2025

(30) Foreign Application Priority Data

Oct. 24, 2023 (CN) ........................ 202311380913.6

(51) Int. Cl.
*H04L 9/32* (2006.01)
*G06F 8/60* (2018.01)

(52) U.S. Cl.
CPC .............. *H04L 9/3226* (2013.01); *G06F 8/60* (2013.01)

(58) Field of Classification Search
CPC ................................ H04L 9/3226; G06F 8/60
See application file for complete search history.

(56) References Cited

U.S. PATENT DOCUMENTS

2008/0147556 A1* 6/2008 Smith ..................... G06F 21/10 705/57
2020/0184042 A1 6/2020 Etchegoyen
2022/0179927 A1* 6/2022 Tai ........................ G06F 21/121

FOREIGN PATENT DOCUMENTS

CN 111090843 B 7/2020
CN 114510685 A 5/2022
TW 1705688 B 9/2020

OTHER PUBLICATIONS

Extended European Search Report issued by the EPO on Sep. 9, 2024.

* cited by examiner

*Primary Examiner* — David R Lazaro
*Assistant Examiner* — Xiang Yu
(74) *Attorney, Agent, or Firm* — Troutman Pepper Locke LLP; Tim Tingkang Xia, Esq.

(57) ABSTRACT

An authorization management method, adapted to a deployed software installed on a first processing device, includes: disabling at least a portion of the deployed software by the first processing device, outputting an encrypted value based on device information of the first processing device after the disabling by the first processing device, receiving and decrypting the encrypted value to obtain decrypted information by a second processing device, and releasing an authorized quota corresponding to the deployed software by the second processing device when the decrypted information matches pre-stored information of the second processing device, wherein the pre-stored information comprises the device information.

20 Claims, 4 Drawing Sheets

AUTHORIZATION MANAGEMENT METHOD AND SYSTEM

CROSS-REFERENCE TO RELATED APPLICATIONS

This non-provisional application claims priority under 35 U.S.C. § 119(a) on Patent Application No(s). 202311380913.6 filed in China on Oct. 24, 2023, the entire contents of which are hereby incorporated by reference.

BACKGROUND

1. Technical Field

This disclosure relates to an authorization management method and system.

2. Related Art

Software suppliers usually only authorize client to install software on a limited number of machines. When a client wants to change the authorized machine, the machine must be connected to the software supplier's server through the network. The software supplier's server can only allow the new machine to use the original authorization quota after confirming that the software on the original machine has been uninstalled and the authorization quota has been released.

However, more and more machines can only operate in an offline environment due to business confidentiality and other factors. As a result, when the client wants to change the authorized machine, the software supplier cannot verify the machine, and thus cannot effectively confirm whether the software on the original machine has been uninstalled.

SUMMARY

Accordingly, this disclosure provides an authorization management method and system.

According to one or more embodiment of this disclosure, an authorization management method, adapted to a deployed software installed on a first processing device, includes: disabling, by the first processing device, at least a portion of the deployed software; outputting, by the first processing device, an encrypted value based on device information of the first processing device after the disabling; receiving and decrypting, by a second processing device, the encrypted value to obtain decrypted information; and releasing, by the second processing device, an authorized quota corresponding to the deployed software when the decrypted information matches pre-stored information of the second processing device, wherein the pre-stored information comprises the device information.

According to one or more embodiment of this disclosure, an authorization management system includes: a first processing device and a second processing device. The first processing device is installed with a deployed software, the first processing device is configured to be triggered to disable at least a portion of the deployed software, and output an encrypted value based on device information of the first processing device after the disabling. The second processing device is configured to store pre-stored information, receive and decrypt the encrypted value to obtain decrypted information, the second processing device is further configured to release an authorized quota corresponding to the deployed software when the decrypted information matches the pre-stored information, wherein the pre-stored information comprises the device information.

In view of the above description, the authorization management method and system according to one or more embodiments of the present disclosure may allow the software supplier to identify the machine attempts to release authorization by decryption. Further, by generating the encrypted value after disabling at least a portion of the deployed software, the software supplier may effectively confirm whether the software on the original machine is indeed uninstalled.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

It should be noted that from the perspective of a software supplier, the embodiments described below are applicable to situations where the client wants to transfer a software installed on an authorized machine to another machine, or when the client wants to uninstall a software from an authorized machine.

Figure 1:
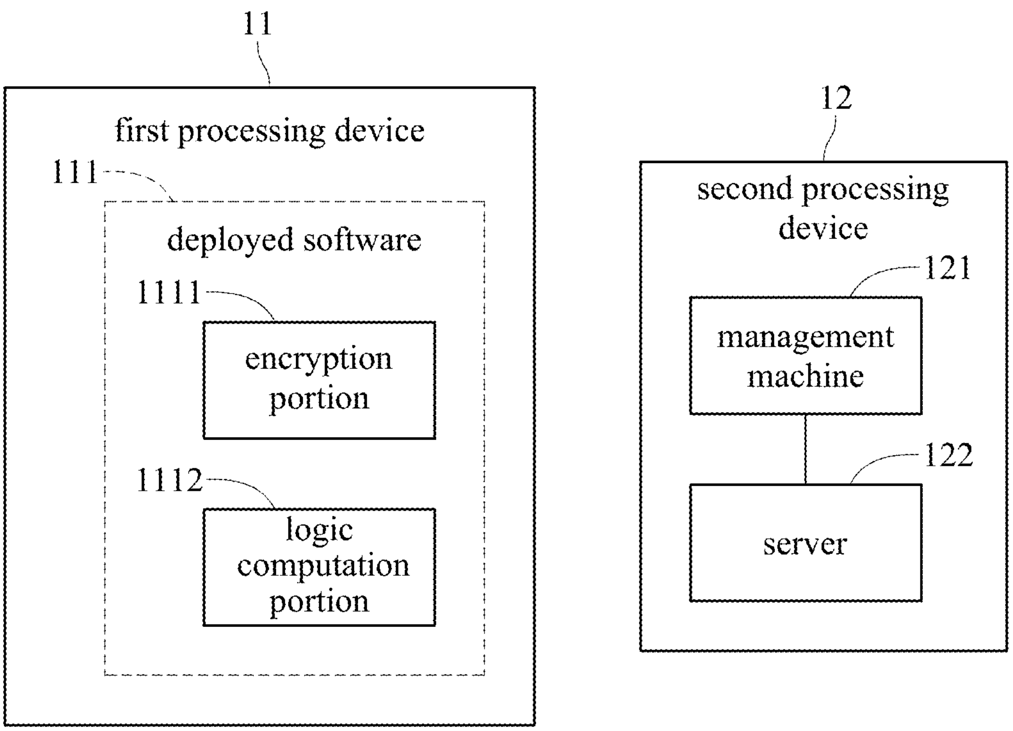
FIG. 1 is a block diagram illustrating an authorization management system according to an embodiment of the present disclosure.

Please refer to FIG. 1, wherein FIG. 1 is a block diagram illustrating an authorization management system according to an embodiment of the present disclosure. As shown in FIG. 1, the authorization management system 1 includes a first processing device 11 and a second processing device 12. The first processing device 11 may be a client side device, and the second processing device 12 may be a device at a software supplier side for managing software installed on the first processing device 11.

Specifically, the first processing device 11 may include a deployed software 111. The deployed software 111 may include an encryption portion 1111 and a logic computation portion 1112. The first processing device 11 may include one or more processors configured to run the encryption portion 1111 and the logic computation portion 1112. The encryption portion 1111 is configured to perform encryption on information to obtain an encrypted value, wherein the encrypted value may be an exclusive password for releasing an authorized quota corresponding to the deployed software 111. The logic computation portion 1112 is configured to perform authorized logic computation function of the deployed software 111. In the one or more embodiments of the present disclosure, the encryption portion 1111 and the logic computation portion 1112 may be a respective portion of the deployed software 111. The deployed software 111 may be implemented by an application (APP).

The second processing device 12 may include a management machine 121 and a server 122 connected with each other. The management machine 121 and the server 122 may each include one or more processors. The management machine 121 and the server 122 may be disposed as one apparatus or different apparatus located locally and remotely, respectively. When the management machine 121 and the server 122 are disposed as one apparatus, the management machine 121 may be an online management platform (a website). The management machine 121 may be used by the user at the first processing device 11 side to manage the first processing device 11 and obtain the encrypted value. The server 122 may be used to verify the encrypted value. Specifically, the deployed software 111 may display the encrypted value through a screen, and the user may manually input the encrypted value displayed by the deployed software 111 into the management machine 121. The server 122 obtains the encrypted value from the management machine 121 and decrypts the encrypted value to obtain decrypted information, and verify the decrypted information by using pre-stored information. When the verification result of the server 122 is that the pre-stored information matches the decrypted information, the server 122 may release the corresponding authorized quota of the deployed software 111.

Figure 2:
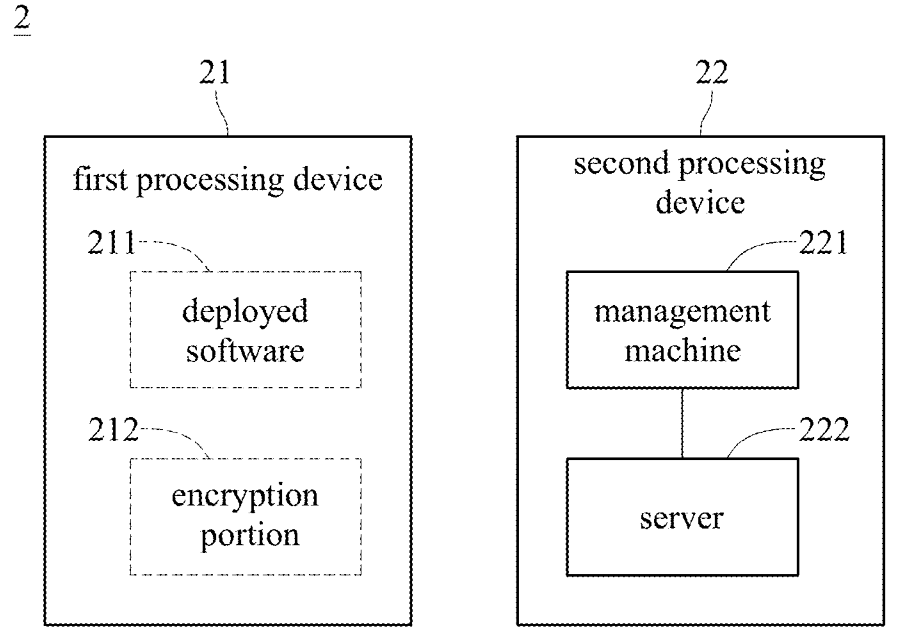
FIG. 2 is a block diagram illustrating an authorization management system according to another embodiment of the present disclosure.

Please refer to FIG. 2, wherein FIG. 2 is a block diagram illustrating an authorization management system according to another embodiment of the present disclosure. As shown in FIG. 2, the authorization management system 2 includes a first processing device 21 and a second processing device 22. The first processing device 21 may include a deployed software 211 and an encryption software 212. The first processing device 21 may include one or more processors (for example, a central processing unit) configured to run the deployed software 211 and the encryption software 212. The deployed software 211 is configured to execute authorized logic computation function. The encryption software 212 is configured to perform encryption on information to obtain the encrypted value. In other words, in this embodiment, the deployed software 211 and the encryption software 212 may be two independent applications on the first processing device 21.

The second processing device 22 may include a management machine 221 and a server 222 connected to each other. The implementation of the second processing device 22 may be the same as that of the second processing device 12 in FIG. 2, its description is not repeated herein.

The above-described processor may be, for example, a central processing unit, a graphics processing unit, microcontroller, a programmable logic controller (PLC) or any other processor with computation function.

It should be noted that the encryption portion 1111, the logic computation portion 1112, the encryption software 212, the management machine 221 and the server 222 shown in FIG. 1 and FIG. 2 may be optionally disposed.

Figure 3:
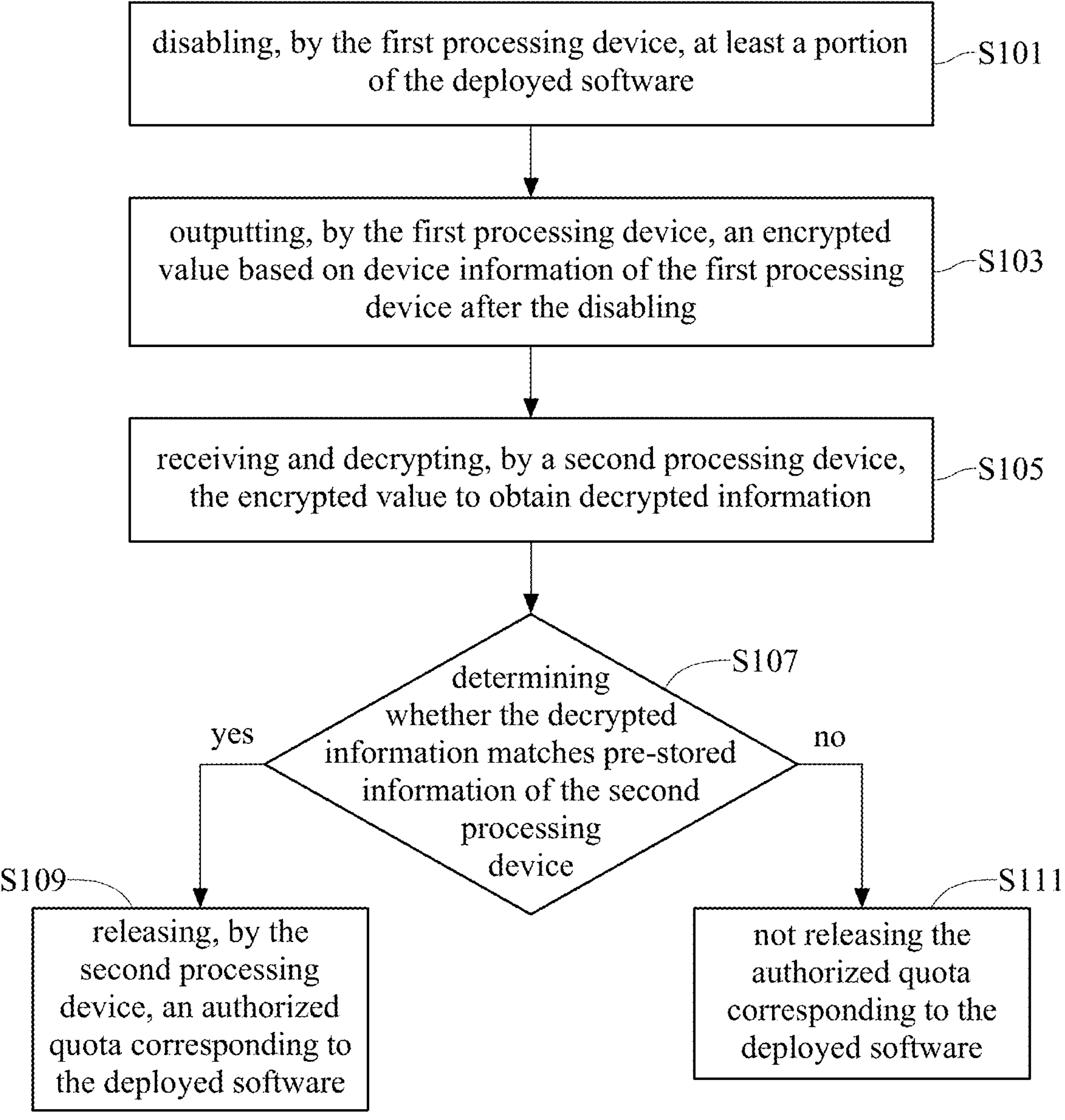
FIG. 3 is a flowchart illustrating an authorization management method according to an embodiment of the present disclosure.

Please refer to FIG. 3, wherein FIG. 3 is a flowchart illustrating an authorization management method according to an embodiment of the present disclosure. The following uses the authorization management system 1 shown in FIG. 1 to explain the authorization management method, but the authorization management method may also be performed by the authorization management system 2 shown in FIG. 2. The authorization management method is adapted to the deployed software 111 installed on the first processing device 11. As shown in FIG. 3, the authorization management method includes: step S101: disabling, by the first processing device, at least a portion of the deployed software; step S103: outputting, by the first processing device, an encrypted value based on device information of the first processing device after the disabling; step S105: receiving and decrypting, by a second processing device, the encrypted value to obtain decrypted information; step S107: determining whether the decrypted information matches pre-stored information of the second processing device; if the determination result of step S107 is "yes", performing step S109: releasing, by the second processing device, an authorized quota corresponding to the deployed software; and if the determination result of step S107 is "no", performing step S111: not releasing the authorized quota corresponding to the deployed software. Step S111 is an optional step.

First, before step S101, the first processing device 11 may determine whether the first processing device 11 is connected to the second processing device 12 after receiving a user command. The user command may indicate to uninstall the deployed software 111 or transfer the deployed software 111 to another machine. If the first processing device 11 is able to connect the second processing device 12, the second processing device 12 may be used to perform procedure corresponding to the user command; and if the first processing device 11 determines that there is no connection with the second processing device 12, the first processing device 11 is triggered by such determination to perform step S101.

In step S101, the first processing device 11 disables a portion of the deployed software 111. Specifically, take the first processing device 11 of FIG. 1 for example, the method of implementing step S101 may be disabling the logic computation portion 1112 and keeping the encryption portion 1111; take the first processing device 21 of FIG. 2 for example, the method of implementing step S101 may be uninstalling the deployed software 211 and keeping the encryption software 212 used to generate the encrypted value.

In step S103, after disabling said portion of the deployed software 111, the encryption portion 1111 of the first processing device 11 encrypts the device information of the first processing device 11 to generate the encrypted value. The encryption portion 1111 may pre-store an encryption key, and use the encryption key to encrypt the device information of the first processing device 11 to generate the encrypted value. In the embodiment of FIG. 2, the method of implementing step S103 may be the encryption software 212 of the first processing device 21 encrypting the device information of the first processing device 21 after the deployed software 211 is uninstalled, to generate the encrypted value. The encryption software 212 may pre-store the encryption key, and use the encryption key to encrypt the device information of the first processing device 11 to generate the encrypted value. For example, the device information may include at least one of a serial number of the first processing device 11/21, device name of the first processing device 11/21, serial number of the deployed software 111/the deployed software 211 and authorization date of the first processing device 11/the first processing device 21 etc., the present disclosure is not limited thereto. The encryption method adopted by the encryption portion 1111/the encryption software 212 is, for example, hash calculation, symmetric encryption or asymmetric encryption, the present disclosure is not limited thereto.

In step S105, the management machine 121 of the second processing device 12 receives an encrypted value input by the user and inputs the encrypted value into the server 122. The server 122 decrypts the encrypted value to obtain the decrypted information. The server 122 may pre-store the encryption key, and use the encryption key to decrypt the encrypted value to obtain the decrypted information.

In step S107, the second processing device 12 determines whether the decrypted information matches the pre-stored information of the second processing device 12. The pre-stored information may include at least one of serial number, device name of an authorized device, serial number of the deployed software and authorization date of a processing device etc. In other words, data type of the pre-stored information may be the same as data type of the device information.

If the second processing device 12 determines that the decrypted information matches the pre-stored information, it means that the pre-stored information includes the device information, and the first processing device 11 is an authorized processing device. Therefore, in step S109, the second processing device 12 may identify the first processing device 11 according to the decrypted information, release the authorized quota corresponding to the deployed software 111 (or the deployed software 211), so that another first processing device may use the released authorized quota of the deployed software 111 (or the deployed software 211).

On the contrary, if the second processing device 12 determines that the decrypted information does not match the pre-stored information, it means that the first processing device 11 is not an authorized processing device. Therefore, in step S111, the second processing device 12 does not release the authorized quota corresponding to the deployed software 111 (or the deployed software 211). Further, when the second processing device 12 determines that the decrypted information does not match the pre-stored information, the second processing device 12 may output a failed verification notification through the management machine 121 to notify the user at the first processing device 11 side that the verification fails.

Figure 4:
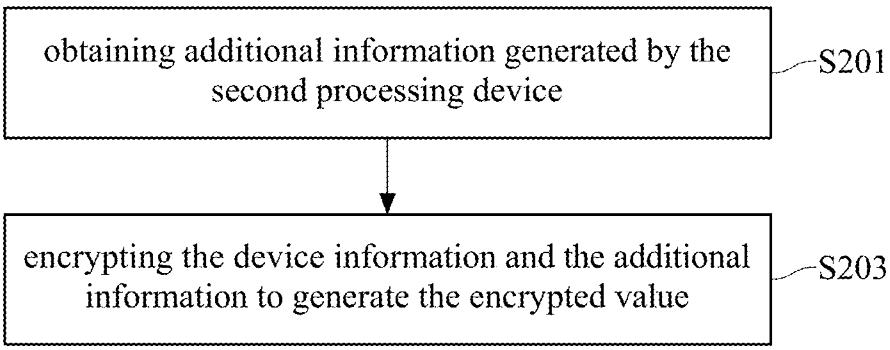
FIG. 4 is a flowchart illustrating a method of generating an encrypted value according to an embodiment of the present disclosure.

Please refer to FIG. 4, wherein FIG. 4 is a flowchart illustrating a method of generating an encrypted value according to an embodiment of the present disclosure. FIG. 4 may be regarded as a detailed flowchart of an embodiment of step S103 of FIG. 3. The following uses the authorization management system 1 of FIG. 1 to describe the method of generating the encrypted value, but the method of generating the encrypted value may also be performed by the authorization management system 2 of FIG. 2. As shown in FIG. 4, the method of generating the encrypted value includes: step S201: obtaining additional information generated by the second processing device; and step S203: encrypting the device information and the additional information to generate the encrypted value.

In step S201, the first processing device 11 obtains the additional information generated by the second processing device 12. For example, the additional information may include at least one of a random code generated after disabling said at least a portion of the deployed software 111, a private password belonging to a dedicated person (for example, technician at the first processing device 11 side), a time point corresponding to the disabling, and external information captured by the second processing device 12 from an external system (for example, cloud). In step S203, the first processing device 11 encrypts the device information and the additional information to generate the encrypted value, wherein the encryption may be performed by using the encryption key described above.

Therefore, if the second processing device 12 determines that the decrypted information matches the pre-stored information (for example, the determination result of step S107 of FIG. 3 is "yes"), it means that the pre-stored information further includes the additional information.

Figure 5:
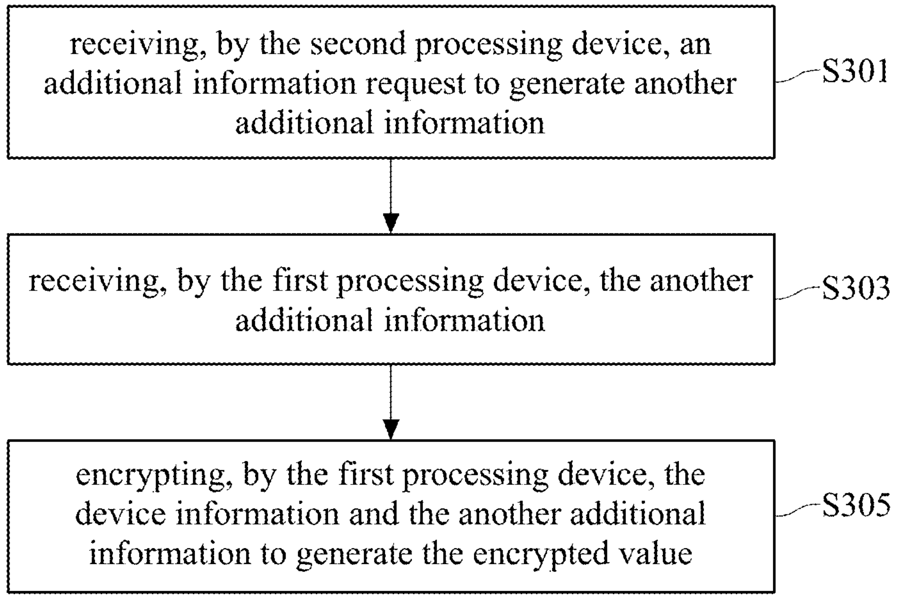
FIG. 5 is a flowchart illustrating a fool-proof method according to an embodiment of the present disclosure.

Please refer to FIG. 1 and FIG. 5, wherein FIG. 5 is a flowchart illustrating a fool-proof method according to an embodiment of the present disclosure. The following uses the authorization management system 1 of FIG. 1 to explain the fool-proof method, but the fool-proof method may also be performed by the authorization management system 2 of FIG. 2. Steps of FIG. 5 may be performed after step S111 of FIG. 3; or, when the determination result of step S107 of FIG. 3 is "no", steps of FIG. 5 may be performed and step S111 may be omitted. Further, FIG. 5 may be performed along with FIG. 4. In other words, in the embodiment where the encrypted value is generated by encrypting the device information and the additional information, when the decrypted value is determined to be not matching the pre-stored information, the second processing device 12 may output the failed verification notification as described above, and the steps in FIG. 5 may be performed.

As shown in FIG. 5, the fool-proof method includes: step S301: receiving, by the second processing device, an additional information request to generate another additional information; step S303: receiving, by the first processing device, the another additional information; and step S305: encrypting, by the first processing device, the device information and the another additional information to generate the encrypted value.

In step S301, since the second processing device 12 may output the failed verification notification to notify the user, the user may input the additional information request at the second processing device 12. The additional information request is configured to request the additional information from the second processing device 12 again. The second processing device 12 may generate the another additional information (referred to as "second additional information" hereinafter) according to the additional information request.

In step S303, the user may manually input the second additional information generated by the second processing device 12 into the first processing device 11. The second additional information may include at least one of a random code generated after disabling said at least a portion of the deployed software 111, a private password belonging to a dedicated person (for example, technician at the first processing device 11 side), a time point corresponding to the disabling, and external information captured by the second processing device 12 from an external system (for example, cloud).

In step S305, the first processing device 11 encrypts the device information and the second additional information received in step S303 to generate the encrypted value. Also, after generating and outputting the encrypted value, step S105 of FIG. 3 may be performed subsequently.

Figure 6:
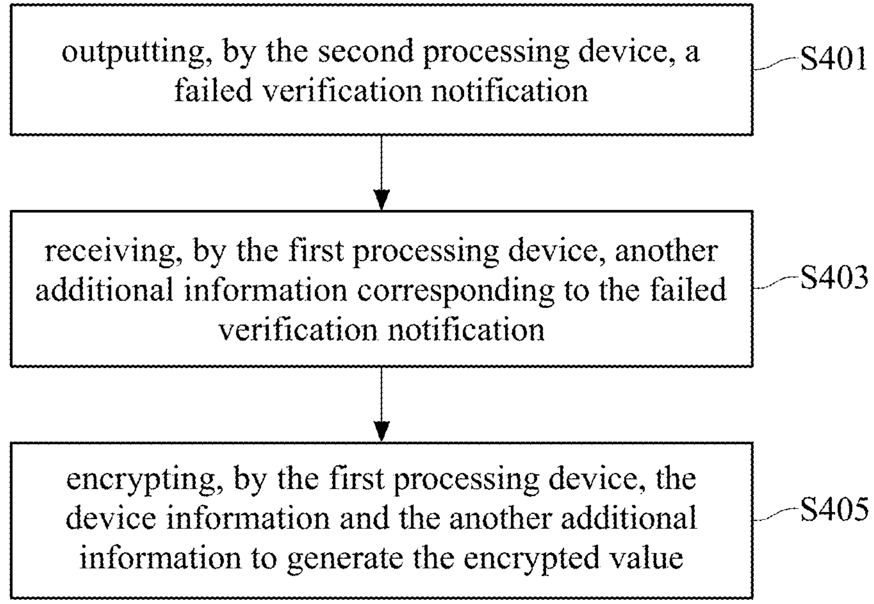
FIG. 6 is a flowchart illustrating an authorization management method according to another embodiment of the present disclosure.

Please refer to FIG. 1 and FIG. 6, wherein FIG. 6 is a flowchart illustrating another fool-proof method of the authorization management method according to another embodiment of the present disclosure. The following uses the authorization management system 1 of FIG. 1 to explain the fool-proof method, but fool-proof method may also be performed by the authorization management system 2 of FIG. 2. Steps of FIG. 6 may be performed after step S111 of FIG. 3; or, when the determination result of step S107 of FIG. 3 is "no", steps of FIG. 6 may be performed and step S111 may be omitted. Further, FIG. 6 may be performed along with FIG. 4. In other words, in the embodiment where the encrypted value is generated by encrypting the device information and the additional information, when the decrypted value is determined to be not matching the pre-stored information, the second processing device 12 may output the failed verification notification as described above, and steps of FIG. 6 may be performed subsequently.

As shown in FIG. 6, the authorization management method includes: step S401: outputting, by the second processing device, a failed verification notification; step S403: receiving, by the first processing device, another additional information corresponding to the failed verification notification; and step S405: encrypting, by the first processing device, the device information and the another additional information to generate the encrypted value.

Specifically, when the second processing device 12 determines that the decrypted information does not match the pre-stored information, it means that the additional information input to the first processing device 11 by the user may be wrong information, which causes the first processing device 11 to generate wrong encrypted value. Therefore, in step S401, the second processing device 12 outputs the failed verification notification to notify the user, and the user may learn that the additional information previously input may be wrong information.

In step S403, the first processing device 11 may receive another additional information (referred to as "third additional information" hereinafter) manually input by the user. The third additional information may be the additional information generated by the second processing device 12 in step S201 of FIG. 4. That is, in step S403, the user may read the additional information generated by the second processing device 12 in step S201 of FIG. 4 again, and input the read information into the first processing device 11 as the third additional information.

In step S405, the first processing device 11 encrypts the device information and the third additional information received in step S403 to generate the encrypted value. Also, after generating and receiving the encrypted value, step S105 of FIG. 3 may be performed subsequently.

One of the fool-proof method shown in FIG. 5 and the fool-proof method shown in FIG. 6 may be performed. Alternatively, when the encrypted value generated through the fool-proof method of one of FIG. 5 and FIG. 6 fails the verification, the fool-proof method of another one of FIG. 5 and FIG. 6 may then be performed.

In addition, in the one or more embodiments described above, when the decrypted information does not match the pre-stored information, the second processing device 12 may count a fail count, and refuse to receive the encrypted value when the fail count is equal to or greater than a default count. Specifically, an initial value of the fail count may be 0, and 1 is added to the fail count when the second processing device 12 decrypts the encrypted value and determines that the decrypted information does not match the pre-stored information. When the fail count is equal to or greater than the default count, it means that the device information/the additional information and/or the encryption key used to generate the encrypted value might be the wrong information/key. Therefore, the second processing device 12 may close a webpage on the management machine 121 that is used to receive the encrypted value or close an input column on the webpage that is used to receive the encrypted value to stop receiving the encrypted value. The second processing device 12 may further stop the operation of the management machine 121 by a default period (for example, 5 minutes).

In view of the above description, the authorization management method and system according to one or more embodiments of the present disclosure may allow the software supplier to identify the machine attempts to release authorization by decryption. Further, by generating the encrypted value after disabling at least a portion of the deployed software, the software supplier may effectively confirm whether the software on the original machine is indeed uninstalled. By using the additional information of the second processing device to generate the encrypted value, the verification process is more secure. Also, by the fool-proof method, an error verification result due to incorrect additional information entered by the user may be avoided.

What is claimed is:

1. An authorization management method, adapted to a deployed software installed on a first processing device, the method comprising:

disabling, by the first processing device, at least a portion of the deployed software to release authorization;

outputting, by the first processing device, an encrypted value based on device information of the first processing device after the disabling;

receiving and decrypting, by a second processing device, the encrypted value to obtain decrypted information; and releasing, by the second processing device, an authorized quota corresponding to the deployed software when the decrypted information matches pre-stored information of the second processing device, wherein the pre-stored information comprises the device information.

2. The authorization management method according to claim 1, wherein outputting, by the first processing device, the encrypted value based on the device information of the first processing device comprises:

obtaining additional information generated by the second processing device, wherein the pre-stored information further comprises the additional information; and encrypting the device information and the additional information to generate the encrypted value.

3. The authorization management method according to claim 2, further comprising:

outputting, by the second processing device, a failed verification notification when the decrypted information does not match the pre-stored information of the second processing device;

receiving, by the first processing device, another additional information corresponding to the failed verification notification; and encrypting, by the first processing device, the device information and the another additional information to generate the encrypted value.

4. The authorization management method according to claim 3, wherein the additional information comprises: at least one of a random code generated after the disabling, a private password belonging to a dedicated person, a time point corresponding to the disabling and external information captured by the second processing device from an external system.

5. The authorization management method according to claim 2, further comprising:

receiving, by the second processing device, an additional information request to generate another additional information when the decrypted information does not match the pre-stored information of the second processing device;

receiving, by the first processing device, the another additional information; and encrypting, by the first processing device, the device information and the another additional information to generate the encrypted value.

6. The authorization management method according to claim 5, wherein the additional information comprises: at least one of a random code generated after the disabling, a private password belonging to a dedicated person, a time point corresponding to the disabling and external information captured by the second processing device from an external system.

7. The authorization management method according to claim 2, wherein the additional information comprises: at least one of a random code generated after the disabling, a private password belonging to a dedicated person, a time point corresponding to the disabling and external information captured by the second processing device from an external system.

8. The authorization management method according to claim 1, wherein the deployed software comprises an encryption portion and a logic computation portion, and disabling, by the first processing device, the at least a portion of the deployed software comprises:

disabling the logic computation portion and keeping the encryption portion.

9. The authorization management method according to claim 1, wherein disabling, by the first processing device, the at least a portion of the deployed software comprises:

uninstalling the deployed software and keeping an encryption software used to generate the encrypted value.

10. The authorization management method according to claim 1, wherein before disabling, by the first processing device, the at least a portion of the deployed software, the method further comprises: determining, by the first processing device, unable to be connected to the second processing device.

11. The authorization management method according to claim 1, further comprising:

counting, by the second processing device, a fail count when the decrypted information does not match the pre-stored information of the second processing device; and closing, by the second processing device, an input column used to receive the encrypted value when the fail count is equal to or greater than a default count.

12. An authorization management system, comprising:

a first processing device including one or more first processors connected to a non-transitory memory storing first instructions and installed with a deployed software, wherein the first processing device is configured to execute the first instructions at the one or more first processors to be triggered to disable at least a portion of the deployed software to release authorization, and to output an encrypted value based on device information of the first processing device after the disabling; and a second processing device including one or more second processors connected to a non-transitory memory storing second instructions, wherein the second processing device is configured to execute the second instruction at the one or more second processors to store pre-stored information, receive and decrypt the encrypted value to obtain decrypted information, and to release an authorized quota corresponding to the deployed software when the decrypted information matches the pre-stored information, wherein the pre-stored information comprises the device information.

13. The authorization management system according to claim 12, wherein the first processing device is configured to obtain additional information generated by the second processing device, and the first processing device encrypts the device information and the additional information to generate the encrypted value, wherein the pre-stored information further comprises the additional information.

14. The authorization management system according to claim 13, wherein the second processing device is further configured to output a failed verification notification when the decrypted information does not match the pre-stored information of the second processing device, and the first processing device is further configured to receive another additional information corresponding to the failed verification notification and encrypt the device information and the another additional information to generate the encrypted value.

15. The authorization management system according to claim 13, wherein the second processing device is further configured to receive an additional information request to generate another additional information when the decrypted information does not match the pre-stored information of the second processing device, and the first processing device is further configure to receive the another additional information and encrypt the device information and the another additional information to generate the encrypted value.

16. The authorization management system according to claim 13, wherein the additional information comprises: at least one of a random code generated after the disabling, a private password belonging to a dedicated person, a time point corresponding to the disabling, and external information captured by the second processing device from an external system.

17. The authorization management system according to claim 12, wherein the deployed software comprises an encryption portion and a logic computation portion, and the first processing device is configured to disable the logic computation portion and keep the encryption portion.

18. The authorization management system according to claim 12, wherein the first processing device is configured to uninstall the deployed software.

19. The authorization management system according to claim 12, wherein the first processing device is configured to disable the at least a portion of the deployed software when determining there is no connection with the second processing device.

20. The authorization management system according to claim 12, wherein the second processing device is further configured to count a fail count when the decrypted information does not match the pre-stored information of the second processing device, and close an input column used to receive the encrypted value when the fail count is equal to or greater than a default count.

* * * * *